United States Patent [19]

Miessler

[11] Patent Number: 4,474,065
[45] Date of Patent: Oct. 2, 1984

[54] ULTRASONIC PROBE

[75] Inventor: Milan H. Miessler, Romsey, England

[73] Assignee: International Business Machines Corporation, Armonk, N.Y.

[21] Appl. No.: 351,077

[22] Filed: Feb. 22, 1982

[30] Foreign Application Priority Data

Jun. 29, 1981 [EP] European Pat. Off. .......... 81302953

[51] Int. Cl.³ .......................................... G01N 29/00
[52] U.S. Cl. .................................... 73/626; 73/628
[58] Field of Search ............... 73/625, 626, 628, 633, 73/602, 641; 128/660; 367/105, 122, 100, 125

[56] References Cited

U.S. PATENT DOCUMENTS

| | | | |
|---|---|---|---|
| 3,346,862 | 10/1967 | Raudsep | 367/125 |
| 3,683,680 | 8/1972 | Johnson et al. | 73/628 |
| 4,235,111 | 11/1980 | Hossler | 73/626 |
| 4,267,584 | 5/1981 | McKeighen et al. | 73/626 |
| 4,359,767 | 11/1982 | Sachs et al. | 73/626 |

FOREIGN PATENT DOCUMENTS 55-70759  5/1980  Japan ................................ 367/100

*Primary Examiner*—Stephen A. Kreitman
*Assistant Examiner*—John E. Chapman, Jr.
*Attorney, Agent, or Firm*—Henry E. Otto, Jr.

[57] ABSTRACT

An ultrasonic probe (1) for use with ultrasonic imaging apparatus for investigating the internal structure of a body contains a pair of pulse echo receivers (RA1, RB1; RA2, RB2; ... ) for each pulse transmitter in a linear array of transmitters (T1, T2, ... ). The two receivers (A,B) in each pair lie in a plane at right-angles to the pulse propagation axis of the associated transmitter and equidistant therefrom. The outputs from the two receivers in each pair are correlated by multiplying in multipliers (11.1, 11.2, 11.3) so that in use the time coincident components of the two waveforms in each receiver pair are emphasized, thus focussing the echo information in the longitudinal plane of symmetry (4) of the probe.

4 Claims, 6 Drawing Figures

ULTRASONIC PROBE

BACKGROUND OF THE INVENTION

1. Field of the Invention

The invention relates to an ultrasonic probe for injecting ultrasonic pulses into a body under investigation, for detecting resulting echo signals from within the body and for generating echo signal waveforms representing the echo signals detected.

2. Description of the Prior Art

Extensive research into real time ultrasonic imaging systems for use in medical diagnosis in the field of obstetrics, opthalmology and internal medicine has led to the development of a variety of devices performing a variety of imaging techniques. One form of such apparatus utilises an ultrasonic probe, incorporating an array of ultrasonic transducers, which in use is placed in contact with a patient's body and selected transducers energised to transmit ultrasound into the body. The ultrasound is reflected from acoustic impedance discontinuities within the body and the echoes are detected and converted by the transducers to electric echo signals. The time delays between the transmission of each ultrasonic pulse into the body and receipt of the echoes of that pulse are proportional to the distances from the various transducers to the discontinuities within the body producing the echoes. In practice, a plurality of transducers are used in a controlled manner to transmit and receive echoes of ultrasound and the resulting electric echo signals processed to construct a cross-sectional image of the body which is displayed on a cathode ray tube.

The number and size of the transducer elements in the array are determined having regard to the design requirements needed for the specific application. The pattern of energisation is selected to provide a beam of required characteristics for the application. Thus for example a linear array of transducers may be used, the angle of incidence of the beam being determined by the phase relationship between the energised elements in the array. In addition to beam steering, the intensity of sound may be enhanced in a selected direction from the centre of a linear array of transducers by phasing the transmission times from individual transmitting transducers. The received echoes are subsequently electronically focussed by reverse phasing of the received signals. This method suffers inevitably from random echoes caused by 'sidelobes' of the transmitted soundwaves.

As an alternative to beam steering, the transducers in a linear array may be energised simultaneously, a group at a time, to achieve homogeneity of the wave and the received echoes routed through selected delay lines, thus achieving a measure of electronic focussing. This method suffers from echo artefacts due to the large area being "insonified" (i.e., bombarded with sound waves), and by the fact that delay lines provide only one part of the time transformation necessary for exact focussing.

SUMMARY OF THE INVENTION

The ultrasonic probe according to this invention differs from the prior art in that a pair of pulse echo receivers are provided for each pulse transmitter in a linear array of transmitters. The two receivers in each pair lie in a plane at right angles to the pulse propagation axis of the transmitter and equidistant therefrom. The outputs from the two receivers in each receiver pair are connected to a device which correlates the individual signal waveforms from the two receivers so that the time coincident components of the two waveforms are emphasised. This has the considerably advantageous effect of focussing the probe in the longitudinal plane of symmetry of the probe.

The transmitters are circular in cross-section and of large diameter in comparison to the receivers which are also circular in cross-section. The receivers are conveniently located in the gaps between adjacent transmitters producing an overall compact package. The circuits for selecting the transmitters and the circuits for processing the echo signal waveforms from the receivers are conveniently provided on each side of a single circuit board. The complete probe is contained in a hand-held container.

BRIEF DESCRIPTION OF THE DRAWINGS

In order that the invention may be fully understood, a preferred embodiment thereof will now be described with reference to the accompanying drawings, wherein.

Figure 1:
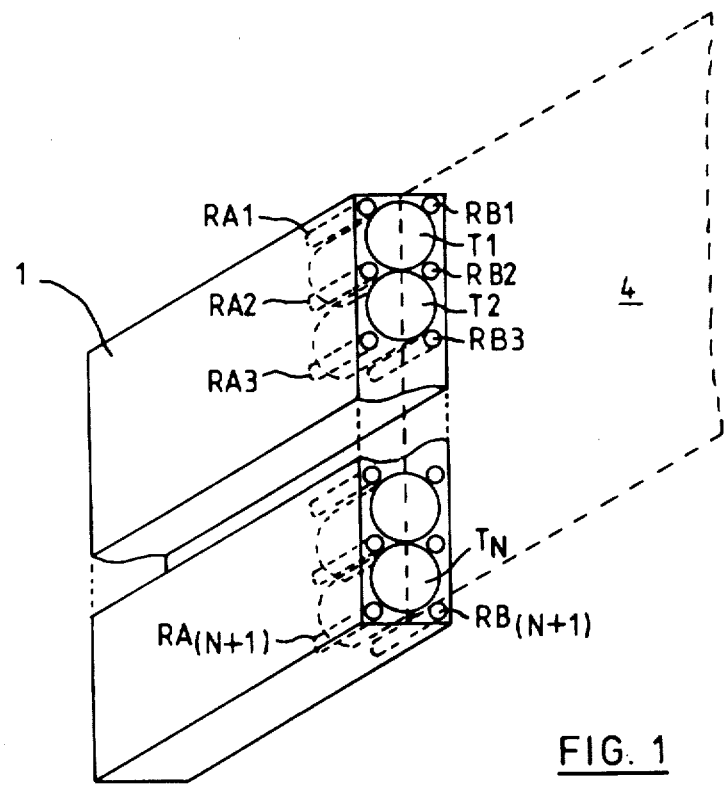
FIG. 1 shows a probe consisting of a linear array of ultrasonic transducers each consisting of a pulse transmitter for injecting a pulse into a body under investigation and a pair of echo receivers for detecting echoes of pulses reflected from within the body.

A probe shown in FIG. 1 consists of a linear array of ultrasonic transducers each consisting of a pulse transmitter for injecting a pulse into a body under investigation and a pair of echo receivers for detecting echoes of pulses reflected from within the body. Specifically, the probe 1 consists of a row of piezoelectric transmitters T1 to TN positioned between two parallel rows of piezoelectric receivers RA1 to RA(N+1) and RB1 to RB(N+1) respectively. The transmitters T are constructed with a relatively larger diameter than that of the receivers RA, RB in order to generate, when energised, a fairly directional sound wave travelling along a substantially parallel beam. The smaller receivers are conveniently located on each side of the array one in each of the two available gaps between adjacent transmitters. Correspondingly positioned receivers in the two rows are regarded as constituting pairs of receivers (RA2, RB2) (RA3, RB3) etc. A further pair of receivers is provided at each end of the array thereby making maximum use of the available space.

Figure 2:
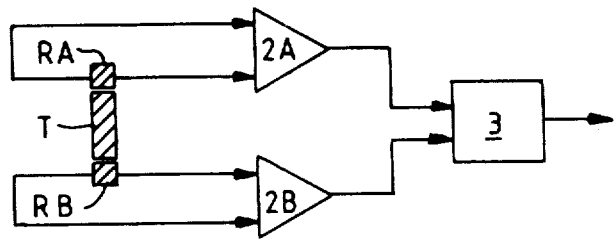
FIG. 2 shows the electrical connections to the probe shown in FIG. 1 for focussing the received echoes in the longitudinal plane of symmetry of the probe.
Figure 3:
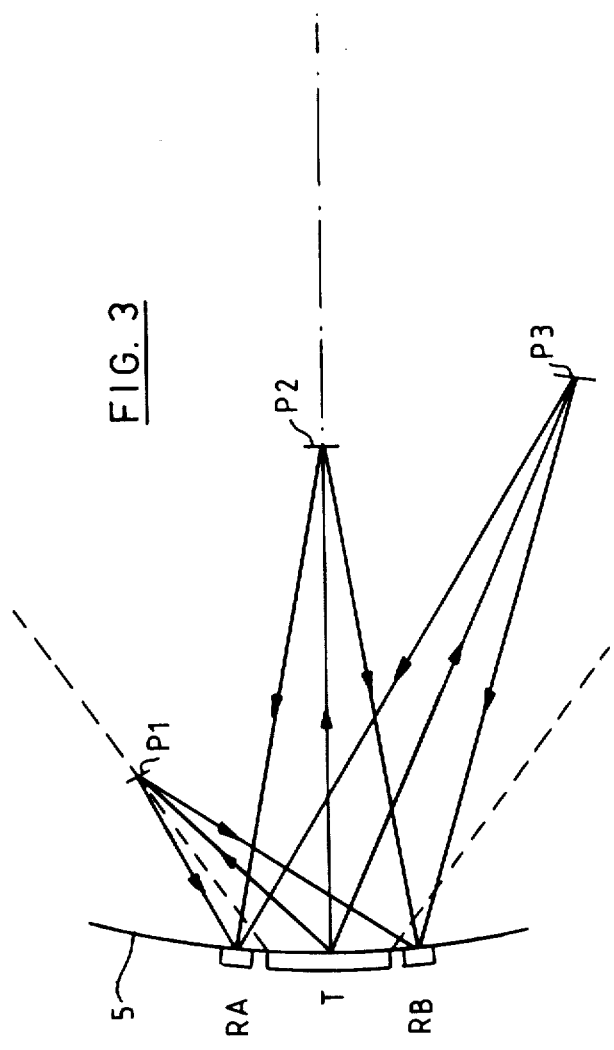
FIGS. 3 and 4 illustrate the timed relationship between echo signals received by the two receivers of a receiver pair following injection of a single pulse into a body having reflecting surfaces variously located within the body.

The arrangement for deriving an electric echo signal from the echoes detected by the individual receivers in a pair of receivers RA, RB is shown in FIG. 2. Here, each receiver RA and RB is connected to a respective differential amplifier 2A and 2B. The output from the two amplifiers are connected as inputs to analogue multiplier 3. The multiplication of the individual echo signals received by the two receivers emphasises the parts of the signal common to both receivers. Since each pair of receivers is symmetrically positioned on each side of the row of transmitters, the output signals received from the multipliers represent echoes received of reflections only from objects lying in the longitudinal plane of symmetry 4 (FIG. 1) of the linear array of transducers. This is illustrated in FIG. 3 which shows a single transmitter T and a receiver pair RA, RB in contact with a body 5 under investigation. A pulse directed into the body in the direction of transmitter longitudinal axis 6 is reflected from discontinuities P1, P2 and P3 within the body. Only discontinuity P2 lies on the longitudinal axis. For the purpose of the illustration, the incident sound is shown diverging widely so as to produce echoes from widely spaced points P1 and P3. In practice, the transmitter face is contoured in a known manner such that the incident beam is substantially parallel.

Figure 4:
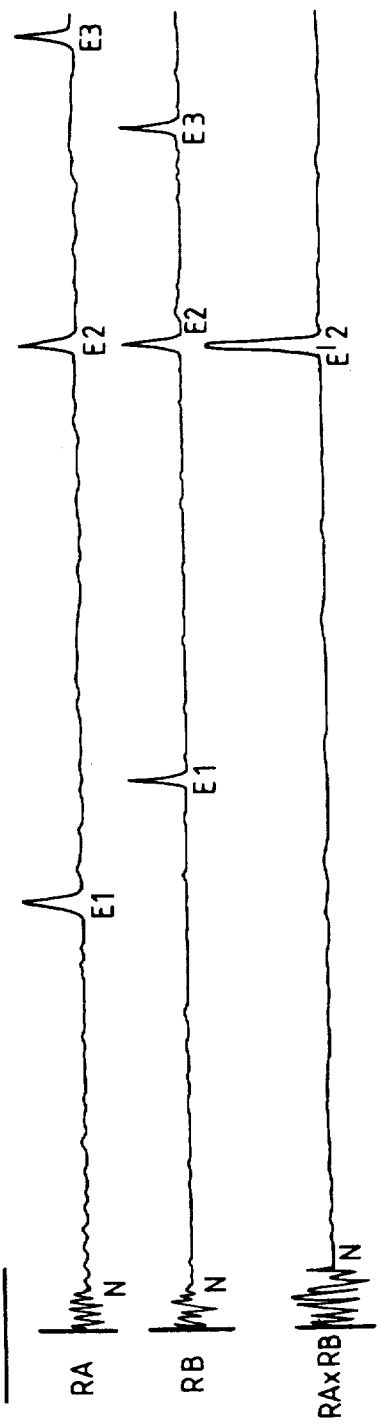

The resulting echo signal waveform generated by the receivers RA and RB and amplifiers 2A and 2B from echoes received from the reflecting points P1, P2 and P3 are shown respectively in waveforms (a) and (b) of FIG. 4 as corresponding echo signals E1, E2 and E3. Each waveform includes initial noise N caused by direct transmission of the injected pulse into the receivers. This noise is attenuated as much as possible by damping material between receivers and transmitters. Detailed description of the physical construction of the probe will be given hereinafter with reference to FIG. 6.

The correlated echo signal waveform output from the associated multiplier 3 to which the waveforms (a) and (b) are applied as inputs is shown in waveform (c) of FIG. 4. The multiplication of the individual signal components E1 and E3 on one waveform by near-zero amplitude signals on the other waveform has resulted in their elimination. The multiplication of the time coincident echo signal components E2 (hereinafter referred to as "common mode signal components") has resulted in a large amplitude signal component E2'. The echo signal content from multiplier 3 therefore represents only echoes received from reflecting entities within the body located along the longitudinal axis 6 of the transmitter. It is seen therefore that the effect of this correlation process on all transducer element outputs is to focus the echoes received by the probe in the longitudinal plane of symmetry, or scan plane 4 as it will hereinafter be referred to, of the probe.

The number of transmitter and receiver pairs in a probe will depend upon the intended application. Thus in our co-pending U.S. patent application Ser. No. 350,928 filed on even date, the ultrasonic imaging apparatus described therein utilises a probe having 23 transmitters and 24 receiver pairs. The transducers are supported closely adjacent to one another and are energised successively in turn to inject a continuous sequential cycle of ultrasonic pulses, one after the other, into the body under investigation. By this means, a complete section of the body defined by the scan plane of the transmitters is repetitively and continuously insonified.

Focussing of the echo information along selected focus lines in the scan plane itself is achieved as described in the aforesaid application by processing the echo signal waveforms received by a selected group of receiver pairs following injection of each individual pulse. The processing of the echo signal waveforms is calculated to compensate for the different propagation times of the echoes from the different reflecting points in the body along selected focus lines, and involves performing time transformations on the correlated echo signal waveforms generated by those receiver pairs in the group associated with the energised transmitter which are off-set from the currently selected focus line. Following the time transformation, all signal waveforms from the group of receivers are themselves correlated by, for example multiplication, to generate a single echo signal waveform containing individual echo signals representing echoes from discontinuities within the body along the currently selected focus line. An important feature of the invention described in the aforesaid application is that by modifying the time transformation process, several unique scan lines of an image may be created from the echo information derived from each individual pulse injected into the body. Accordingly the process is repeated, changing the time transformation process as required, to generate echo information for a plurality of equally spaced focus lines for each pulse injected by each transmitter in turn. As each new transmitter is selected, so a group of receiver pairs is identified to generate echo information for processing. The individual echo signals in each echo signal waveform representing the echoes from each focus line in turn, are used to modulate the intensity of a CRT beam which is scanning in synchronism with the ultrasonic imaging apparatus to build up a complete cross-sectional image of the internal structure with one CRT scan line for each focus line across the insonified section of the scan plane.

Probe selection circuits are therefore required to respond to control signals supplied from the user imaging apparatus to step through the transmitters in the required sequence; select the group of receiver pairs associated with each transmitter taken in turn; correlate the signals from the two receivers in each receiver pair to focus the echoes in the scan plane; and supply the focussed echo signals as output to the user imaging apparatus. The circuits and their connections are shown schematically in FIG. 5.

In the figure an ultrasonic probe 1 is shown consisting of twenty-three transmitters T1 to T23 arranged in a row, positioned between two parallel rows of twenty-four receivers arranged in pairs RA1, RB1 to RA24, RB24. Each transmitter is individually connected to a count decoder unit 7 which operates in response to an increment transmitter/receiver clock signal on input terminal 9, and fire transmitter signal on input terminal 8 to connect each transmitter in turn in a continuous sequence to a voltage supply (e.g., 50 volts) applied to terminal 10. The signal supplied to terminals 8 and 9 and the voltage on terminal 10 are provided by ultrasonic imaging apparatus using the probe.

In this embodiment of the invention, a group of three receiver pairs is associated with each transmitter. Specifically, receiver pairs RA1, RB1; RA2, RB2; and RA3, RB3 are associated with transmitter T1, receiver pairs RA2, RB2; RA3, RB3; and RA4, RB4 with transmitter T2 and so on stepping through the array to the final groups RA22, RB22; RA23, RB23; and RA24, RB24 associated with transmitters T22 and T23.

Figure 5:
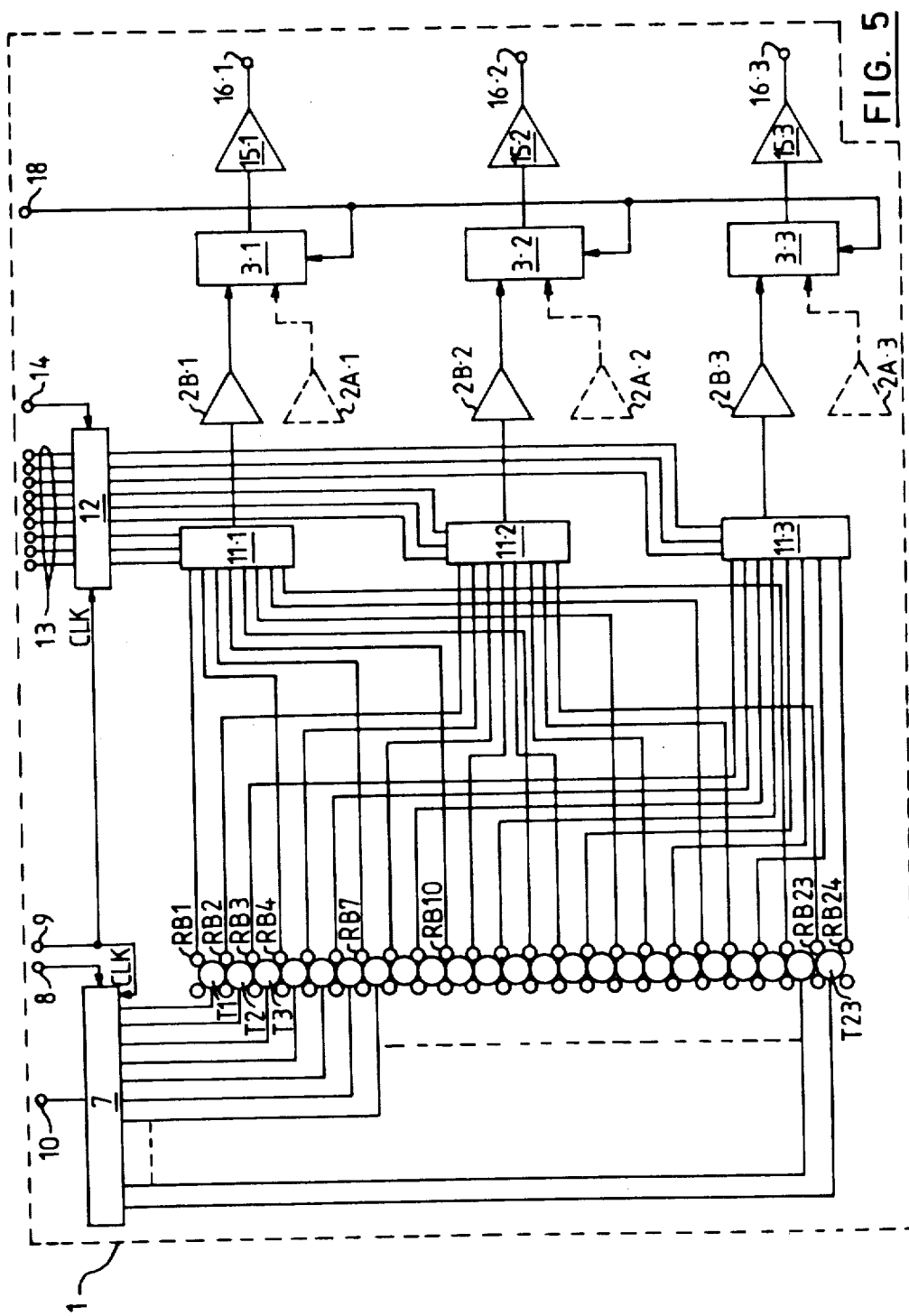
FIG. 5 shows the transmitter selection and echo signal processing circuits of the probe.

Each receiver in a group of receiver pairs is connected to one of a number of associated individual receiver select registers 11 which operate under control of a decoder register 12 to gate the individual echo signal waveforms generated by the receivers in a selected group through to its output. FIG. 5 has been simplified to show only selection circuits for one receiver of each receiver pair, it being understood that selection of the other receiver is performed in an identical manner.

Thus outputs from receivers RB1, RB4 . . . RB22 are connected as input to receiver select register 11.1; the outputs from receivers RB2, RB5 . . . RB23 are connected as inputs to receiver select register 11.2; and the outputs from receivers RB3, RB6 . . . RB24 are connected as inputs to receiver select register 11.3. The selection of the receivers in each group is by means of decoder 12 in response to input data supplied over 9-bit bus 13 from the user imaging apparatus. The information supplied over bus 13 is decoded and supplied as separate 3-bit inputs to the three receiver select registers 11.1, 11.2 and 11.3 to gate through the echo signal waveforms from the associated receivers in the required group. The input data supplied to decoder 12 identifying the next group of registers to be selected is loaded into the decoder on occurrence of a set select signal from the user imaging apparatus via input terminal 14 and the decoded information gated to the three receiver select registers on occurrence of the transmitter/receiver clock signal from terminal 9. The decoder can be loaded with the new data as soon as the echo information from the current group of receivers has been utilised by the user apparatus.

The output from each receiver select register 11.1, 11.2, 11.3 supplied to a respective amplifier 2B.1, 2B.2, 2B.3 and the outputs from the amplifiers supplied as one input to an associated one of three multipliers 3.1, 3.2, 3.3. The other inputs to the multipliers are supplied from corresponding amplifiers 2A.1, 2A.2, 2A.3 associated with the receivers forming the other half of the receiver pairs in the group. The output from multiplier 3.1, 3.2, 3.3 are supplied via amplifiers 15.1, 15.2 and 15.3 respectively to output terminals 16.1, 16.2, 16.3. Since the echo signals become progressively attenuated by the body tissue the greater the distances they have to travel, the gain of the multipliers is increased with time to compensate. A varying voltage gain control signal is supplied currently to all three multipliers by the user imaging apparatus via input terminal 18.

In operation, therefore, selection of the next successive transmitter (T1 say) is accompanied by the simultaneous identification and selection of the associated receiver pair grouping (RA1, RB1; RA2, RB2; RA3, RB3). The echo signals of the pulse injected by the transmitter are detected by the selected receiver pair group and are gated through the two sets of registers (one set 11.1, 11.2, 11.3 shown) amplified by amplifier 2A1, 2B1; 2A2, 2B2; 2A3, 2A3 and the amplified echo signal waveforms from the two receivers in each receiver multiplied together by the associated multipliers 3.1, 3.2, 3.3. Over the period during which the echo signal waveforms are being multiplied together, the gain of the multipliers is being progressively increased to compensate for signal attenuation. The output from the multipliers representing those echoes detected by each receiver originating from points with the body in the scan plane defined by the probe are amplified further by amplifiers 15.1, 15.2, 15.3 and supplied as output signals for the user imaging apparatus on terminals 16.1, 16.2, 16.3.

Figure 6:
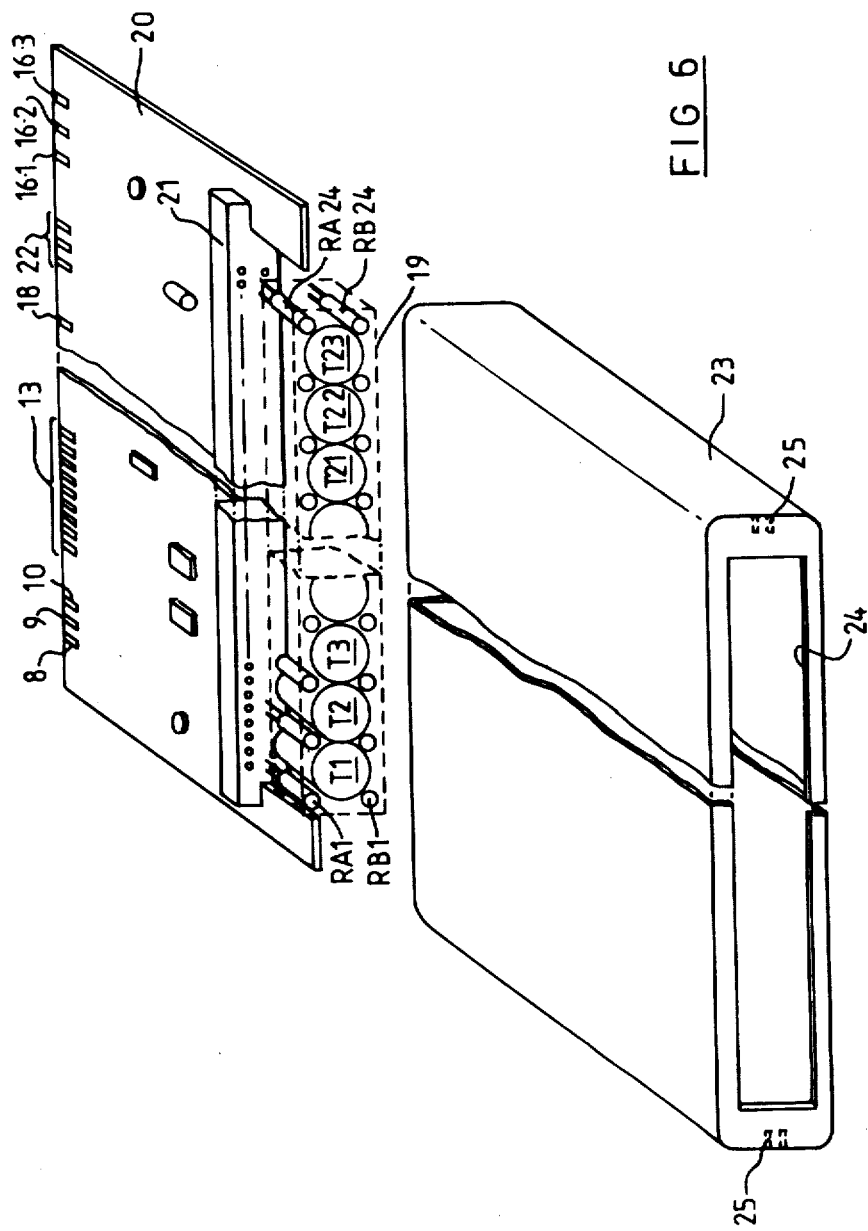
FIG. 6 shows the physical construction and packaging of the probe.

The practical probe assembly is shown as a hand-held unit in FIG. 6. In this figure the piezoelectric transmitters T1 to T23 and piezoelectric receiver pairs RA1, RB1 . . . RA24, RB24 are insulated from each other by a thin layer of damping material (not shown) interleaved therebetween. The entire transducer assembly is potted in a plastics block 19 for support. Each piezoelectric transducer has two wires for connection to the controlling circuits. In the case of a transmitter, one wire is for connection to the energising voltage supply and the other to ground. The ground connections were excluded from the circuit diagram of FIG. 5 for simplicity. In the case of a receiver, the echo signals are generated as differential signals on the two wires. Only one output was shown for each receiver in FIG. 5 for simplicity. It will be understood that with differential outputs the various amplifiers are in fact differential amplifiers.

The potted transducer block 19 is supported in a cut-away portion of a circuit card 20. An elongated pin connector 21 is supported in the cut-away portion and receives the transducer pins. The transmitter and receiver selection circuitry, the amplifiers and multipliers are all supported as individual components and modules (a few shown schematically) and interconnected on the two sides of the card 20. Clearly it is convenient to mount corresponding components for the two sets of receivers forming the receiver pairs on opposite sides of the card. The signals required to drive the probe are supplied to signal tabs 8, 9, 10, 18 and bus 13, power inputs for the components to tabs 22 and the three output signals from output tabs 16.1, 16.2, 16.3. The entire circuit board and probe assembly is supported for use in a moulded box 23 having an elongated aperture 24 exposing the transmitters and receiver pairs. The assembly is supported within the box by a pair of integral moulded rails 25.

I claim:
1. An ultrasonic probe comprising:
a row of ultrasonic transmitters each operable to inject a pulse of ultrasound as a substantially non-divergent soundwave along its longitudinal axis into a body under investigation, said transmitters being mounted adjacent one another with their longitudinal axes parallel and lying in a first plane;
two identical rows of ultrasonic receivers positioned one row on each side of said first plane with corresponding receivers in the two rows constituting receiver pairs, the two receivers in each receiver pair being positioned equidistant from and on a line orthogonal to said first plane, each receiver being operable to generate echo signal waveforms including echo signals representing detected echoes of an injected pulse from discontinuities within said body;
means for multiplying the two echo signal waveforms from each receiver pair so as to emphasise those signal components of the receiver pair waveforms which are coincident and substantially eliminate all other signal components;
transmitter selection means operable to select each transmitter in turn in a predetermined sequence;
two sets of receiver gating means, each set connected to a selected group of receivers constituting the receivers of a respective one of the receiver pairs; and
said multiplying means comprising a multiplier operable, responsively to selection of a respective corresponding individual transmitter to inject a pulse into a body, to cause the combination and emphasis only of the time-coincident components of the resulting echo signal waveforms gated via said gating means from the groups of paired receivers associated with that transmitter.

2. An ultrasonic probe as claimed in claim 1, wherein each transmitter has a diameter significantly larger than that of said receivers to cause each transmitter to generate, when energized, said substantially non-divergent soundwave as a substantially parallel beam.

3. An ultrasonic probe as claimed in claim 1, in which said two rows of receivers are parallel to one another and the transmitting faces of the transmitters and receiving faces of the receivers lie substantially in a second plane orthogonal to said first plane.

4. An ultrasonic probe as claimed in claim 1, including:
- a circuit card along the edge of which said transmitters and receivers are mounted;
- one set of receiver gating means disposed on one side of said card and operatively connected to one of said rows of receivers; and
- the other set of receiver gating means disposed on the other side of said card and operatively connected to the other of said rows of receivers.

* * * * *